United States Patent
Sambongi (10) Patent No.: US 8,862,396 B2
(45) Date of Patent: Oct. 14, 2014

(54) POSITIONING DEVICE AND POSITIONING METHOD

(75) Inventor: Masao Sambongi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 510 days.

(21) Appl. No.: 12/817,321

(22) Filed: Jun. 17, 2010

(65) Prior Publication Data

US 2011/0010089 A1    Jan. 13, 2011

(30) Foreign Application Priority Data

Jul. 9, 2009  (JP) ................................ 2009-162293

(51) Int. Cl.
*G01C 21/00* (2006.01)
*G01C 21/10* (2006.01)
*G01C 21/28* (2006.01)
*G01C 21/16* (2006.01)

(52) U.S. Cl.
CPC .............. *G01C 21/165* (2013.01); *G01C 21/28* (2013.01)
USPC ........... 701/501; 701/472; 701/480; 701/498; 701/500; 701/505

(58) Field of Classification Search
USPC .......................... 701/472, 480, 498, 500, 505
See application file for complete search history.

(56) References Cited

U.S. PATENT DOCUMENTS

| | | | |
|---|---|---|---|
| 5,422,639 A * | 6/1995 | Kobayashi et al. | 340/988 |
| 5,902,351 A * | 5/1999 | Streit et al. | 701/446 |
| 6,408,245 B1 * | 6/2002 | An et al. | 701/472 |
| 6,615,135 B2 * | 9/2003 | Davies | 701/480 |
| 6,697,736 B2 * | 2/2004 | Lin | 701/472 |
| 6,826,478 B2 * | 11/2004 | Riewe et al. | 701/470 |
| 2002/0065603 A1 * | 5/2002 | Watanabe et al. | 701/207 |
| 2002/0169553 A1 * | 11/2002 | Perlmutter et al. | 701/214 |
| 2003/0149528 A1 * | 8/2003 | Lin | 701/214 |
| 2007/0010940 A1 | 1/2007 | Tan et al. | |

FOREIGN PATENT DOCUMENTS

| | | |
|---|---|---|
| JP | 4-50718 | 2/1992 |
| JP | 11-230772 | 8/1999 |
| JP | 2003-194558 | 7/2003 |
| JP | 2008-232771 | 10/2008 |

OTHER PUBLICATIONS

European Search Report for 10166911.7 Mailed Oct. 29, 2010.
Japanese Office Action for Application No. 2009-162293 mailed on Apr. 12, 2011.
European Office Action for European Application No. 10 166 911.7 mailed on Jun. 22, 2011.

* cited by examiner

*Primary Examiner* — Fadey Jabr
*Assistant Examiner* — Thomas Ingram
(74) *Attorney, Agent, or Firm* — Amin, Turocy & Watson, LLP (57) ABSTRACT

A positioning device including a movement measuring unit for measuring a relative positional change and a passing position calculation control unit for continuing measurement of the positional change of the movement measuring unit during movement, being given position data of any first point at the first point on a moving route excluding a start point, and determining position data of a point which has been passed before arrival at the first point on the basis of the given position data of the first point and data of the positional change continuously measured by the movement measuring unit.

6 Claims, 5 Drawing Sheets

FIG. 2A

| | MOVEMENT RECORD DATA | | |
|---|---|---|---|
| No. | TIME DATA | POSITION DATA | CORRECTION FLAG |
| 1 | ::** | X: 0.0, Y: 0.0 | 0 |
| 2 | ::** | X: −0.2, Y: 0.0 | 0 |
| 3 | ::** | X: −0.4, Y: 0.0 | 0 |
| ⋮ | ⋮ | ⋮ | ⋮ |
| N−1 | ::** | X: −61.2, Y: 38.8 | 0 |
| N | ::** | X: −61.0, Y: 39.0 | 0 |

FIG. 2B

| | MOVEMENT RECORD DATA | | |
|---|---|---|---|
| No. | TIME DATA | POSITION DATA | CORRECTION FLAG |
| 1 | ::** | X: 341.0, Y: 141.0 | 1 |
| 2 | ::** | X: 340.8, Y: 141.0 | 1 |
| 3 | ::** | X: 340.6, Y: 141.0 | 1 |
| ⋮ | ⋮ | ⋮ | ⋮ |
| N−1 | ::** | X: 279.8, Y: 179.8 | 1 |
| N | ::** | X: 280.0, Y: 180.0 | 1 |

| DISPLACEMENT DATA BASE | | |
|---|---|---|
| No. | TIME DATA | DISPLACEMENT DATA |
| 1 | ::** | X: 0.0, Y: 0.0 |
| 2 | ::** | X: −0.2, Y: 0.0 |
| 3 | ::** | X: −0.2, Y: 0.0 |
| ⋮ | ⋮ | ⋮ |
| N−1 | ::** | X: 0.2, Y: 0.2 |
| N | ::** | X: 0.2, Y: 0.2 |

FIG. 5B

| MOVEMENT RECORD DATA | | |
|---|---|---|
| No. | TIME DATA | POSITION DATA |
| 1 | ::** | X: 341.0, Y: 141.0 |
| 2 | ::** | X: 340.8, Y: 141.0 |
| 3 | ::** | X: 340.6, Y: 141.0 |
| ⋮ | ⋮ | ⋮ |
| N−1 | ::** | X: 279.8, Y: 179.8 |
| N | ::** | X: 280.0, Y: 180.0 |

POSITIONING DEVICE AND POSITIONING METHOD

CROSS-REFERENCE TO RELATED APPLICATIONS

This application is based upon and claims the benefit of priority from the prior Japanese Patent Application No. 2009-162293, filed on Jul. 9, 2009, the entire contents of which are incorporated herein by reference.

BACKGROUND OF THE INVENTION

1. Field of the Invention

The present invention relates to a positioning device and position method.

2. Description of the Related Art

A positioning device having an autonomous navigation function has been known. According to the autonomous navigation function, after positioning of a reference point is performed by using a positioning unit which can measure an absolute position such as GPS (Global Positioning System) or the like, for example, a moving direction and a moving amount are measured by autonomous navigation sensor such as an acceleration sensor, an azimuth sensor, etc., and displacement data obtained by the autonomous navigation sensors is successively accumulated into the position data of the reference point, thereby calculating the position data of each point on a moving route.

Some correcting techniques have been hitherto proposed for the positioning device having the autonomous navigation function. According to these correcting techniques, when calculation of position data based on the autonomous navigation function and positioning based on GPS are simultaneously performed at some point, the position data of that point is corrected on the basis of a positioning result and also a measurement error of the autonomous navigation sensor is corrected on the basis of a positioning result of GPS (for example, JP-A-2008-232771, JP-A-11-230772).

The positioning devices of the related arts have a problem that it would be impossible to calculate position data of each point during movement if position data of a starting point is separately obtained by some means when the positioning based on the autonomous navigation function is performed in the positioning device.

The position data obtained by the positioning device is not only used on a real-time basis during movement, but also used to check past movement points after the movement. Accordingly, even when position data is not obtained on a real-time basis, it may be required afterwards to obtain position data of each point which has been passed in the past.

SUMMARY OF THE INVENTION

An object of the present invention is to provide a positioning device and a positioning method that can obtain position data of each point during movement by an autonomous navigation function without obtaining any position data of a starting point.

In order to attain the above object, according to an aspect of the present invention, there is provided a positioning device comprising: a movement measuring unit for measuring a relative positional change; and a passing position calculation control unit for continuing measurement of the positional change of the movement measuring unit during movement, being given position data of any first point at the first point on a moving route excluding a start point, and determining position data of a point which has been passed before arrival at the first point on the basis of the given position data of the first point and data of the positional change continuously measured by the movement measuring unit.

Furthermore, according to another aspect of the present invention, there is also provided a positioning method for obtaining position data on a moving route by using a movement measuring unit for measuring a relative positional change and a positioning unit that can measure a present position, the positioning method comprising a passing position calculation control step of continuing measurement of the positional change of the movement measuring unit during movement, being given position data of any first point at the first point on a moving route excluding a start point by the positioning unit, and determining position data of a point which has been passed before arrival at the first point on the basis of the given position data of the first point and data of the positional change continuously measured by the movement measuring unit.

BRIEF DESCRIPTION OF THE DRAWINGS

FIGS. 2A and 2B are data charts showing an example of movement record data stored in a movement record data storing unit, wherein

FIGS. 3A to 3C are diagrams showing the processing content of movement positioning processing of this embodiment, wherein

FIGS. 5A and 5B are data charts showing another method of the autonomous navigation positioning processing of calculating position data of a movement route afterwards, wherein

DETAILED DESCRIPTION OF THE PREFERRED EMBODIMENT

A preferred embodiment according to the present invention will be described with reference to the accompanying drawings.

Figure 1:
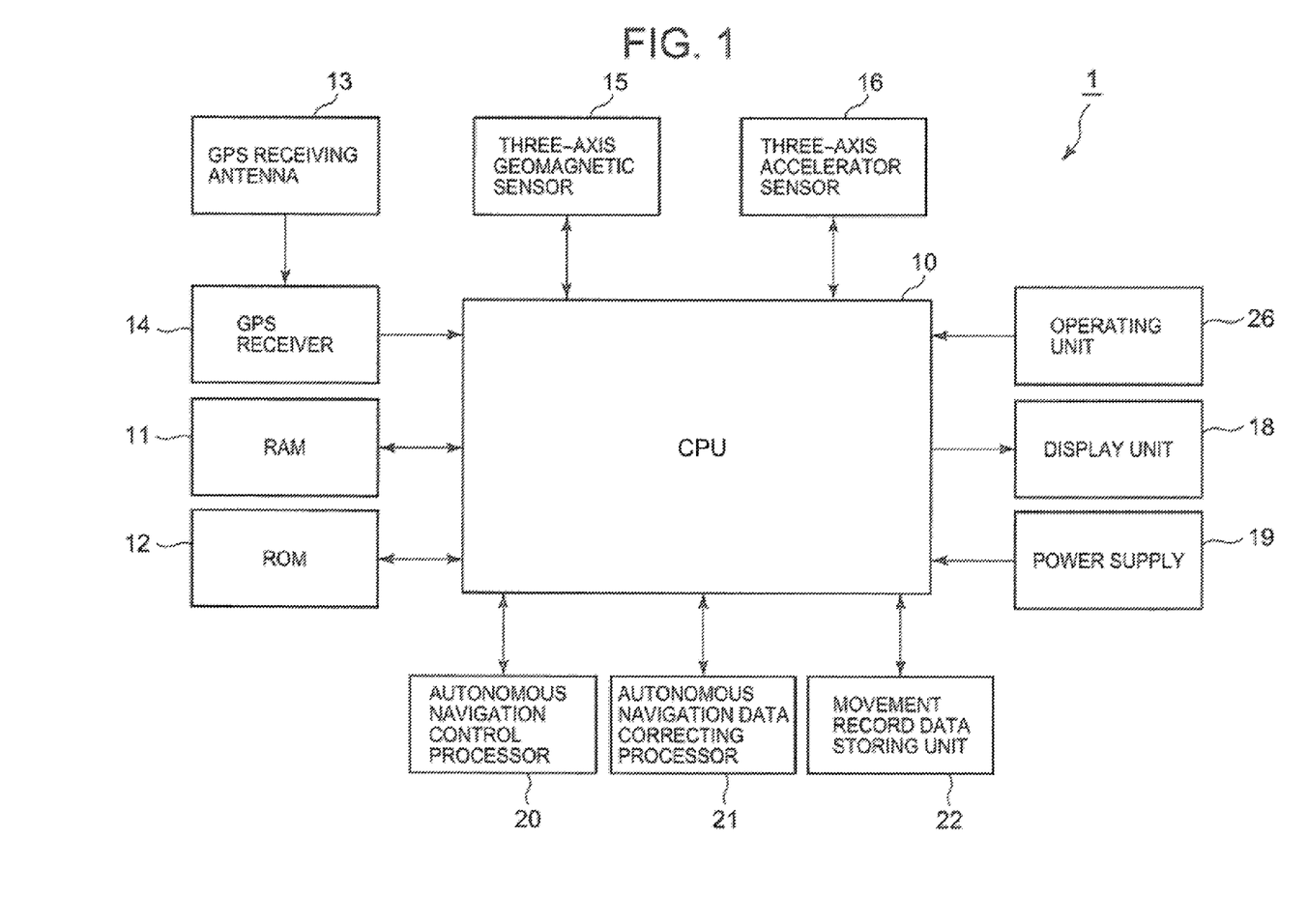
FIG. 1 is a block diagram showing the whole of a navigation device according to an embodiment of the present invention.

FIG. 1 is a block diagram showing the whole of a navigation device 1 as a positioning device according to an embodiment of the present invention.

A navigation device 1 according to this embodiment is a device for successively recording position data of each point on a moving route while performing positioning processing during movement. As shown in FIG. 1, this navigation device 1 has CPU (Central Processing Unit) 10 for performing the overall control of the device, RAM 11 for supplying a working memory space to CPU 10, ROM 12 for storing control programs to be executed by CPU 10 and control data, a GPS receiving antenna 13 and a GPS receiver 14 for receiving transmission data from a GPS (Global Positioning System) satellite, a three-axis geomagnetic sensor 15 and a three-axis acceleration sensor 16 as autonomous navigation sensors, a display unit 18 for displaying various kinds of information and images, a power source 19 for supplying an operating voltage to each part, an operating unit 26 for inputting an operating instruction from the external, an autonomous navigation control processor 20 for performing positioning calculation of autonomous navigation on the basis of measurement data of the autonomous navigation sensors 15 and 16, an autonomous navigation data correcting processor 21 for performing correcting calculation of the position data obtained by the autonomous navigation control processor 20, a movement record data storage unit 22 for successively storing a series of position data along a moving route, etc.

The GPS receiver 14 executes demodulation processing on a signal received through the GPS receiving antenna 13 on the basis of an operating instruction from CPU 10, and sends various kinds of transmission data of the GPS satellite to CPU 10. CPU 10 performs predetermined positioning calculation on the basis of the transmission data of the GPS satellite to obtain position data representing the present position.

The three-axis geomagnetic sensor 15 is a sensor for detecting the direction of terrestrial magnetism, and the three-axis acceleration sensor 16 is a sensor for detecting the acceleration in each of the three axial directions.

The autonomous navigation control processor 20 assists the calculation processing of CPU 10. Autonomous navigation control processor 20 inputs through CPU 10 the measurement data of the three-axis geomagnetic sensor 15 and the three-axis acceleration sensor 16 at a predetermined sampling period, and successively calculates the moving direction and the moving amount of the navigation device 1 from these measurement data. Furthermore, the autonomous navigation control processor 20 successively accumulates vector data comprising the calculated moving direction and moving amount into the position data of the reference point supplied from CPU 10, thereby obtaining the position data of the moving point and supplying the position data to CPU 10.

The autonomous navigation data correcting processor 21 is a processing unit for assisting the calculation processing of CPU 10. The autonomous navigation data correcting processor 21 performs a correcting operation of correcting one or a plurality of temporary position data calculated by the autonomous navigation control processor 20 and stored in the movement record data storing unit 22 to true position data on the basis of position data given by GPS positioning at a point during movement or at the end of the movement. The content of the correcting calculation will be described later in detail.

Figure 2A:
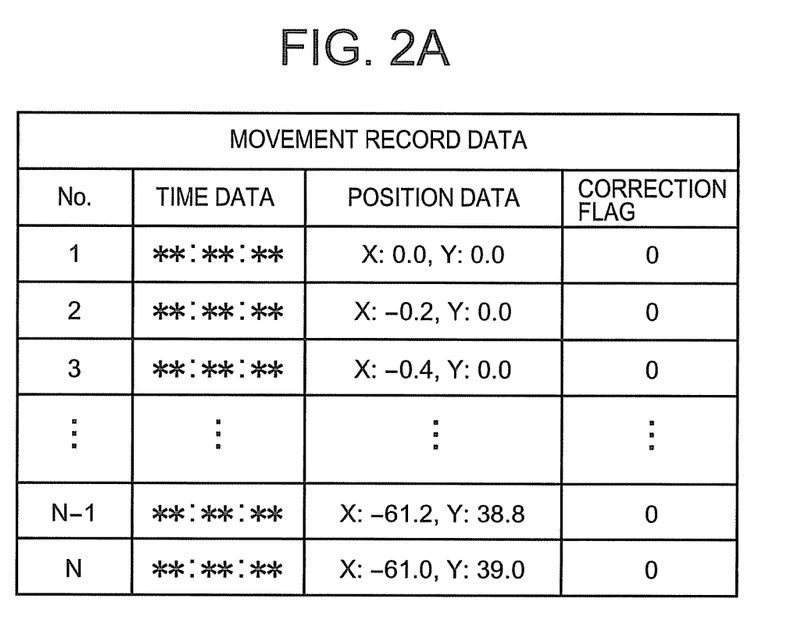
FIG. 2A shows movement record data in which position data before correction are stored.
Figure 2B:
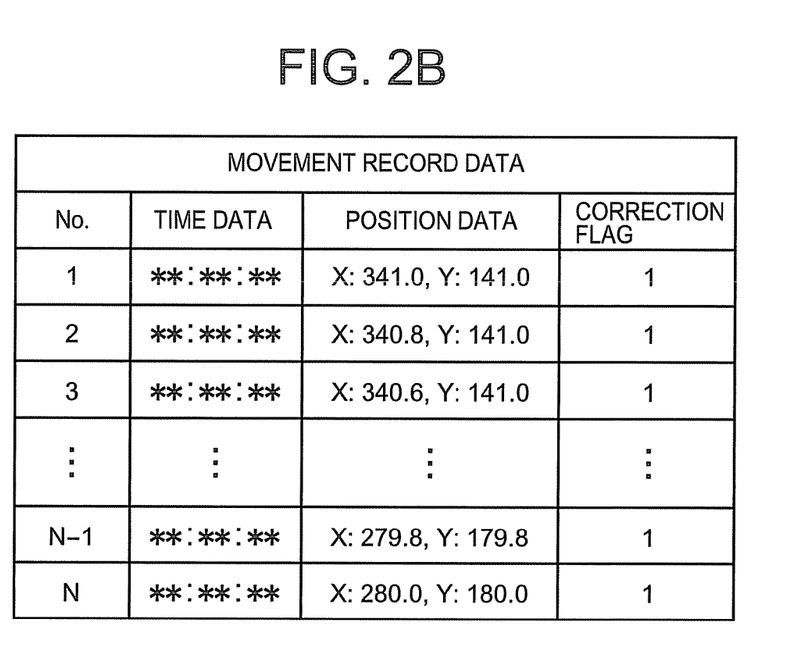
FIG. 2B shows movement record data in which position data after correction are stored.

FIGS. 2A and 2B are data charts showing an example of the movement record data stored in the movement record data storing unit 22. FIG. 2A shows the movement record data in which position data before correction are stored, and FIG. 2B shows the movement record data in which position data after correction are stored.

The movement record data storing unit 22 is constructed by RAM, a non-volatile memory or the like, and movement record data are recorded in the movement record data storing unit as shown in FIG. 2. The movement record data are constructed by successively registering the position data obtained through the movement positioning processing during movement of the device. Appending to a series of position data, an index number "No." representing an obtaining order of the position data, a time data representing a time at which the position data is obtained, a correction flag representing whether the position data has been corrected or not, etc. are registered in the movement record data.

In ROM 12 is stored a program for the movement positioning processing of successively obtaining position data of each point on a moving route by using the position measurement based on the autonomous navigation function and the position measurement based on GPS in combination. This program may be stored not only in ROM 12, but also in a portable storage medium such as an optical disc or the like or a non-volatile memory such as a flash memory or the like which is readable by CPU 10 through a data reading device. This program may be downloaded into the navigation device 1 through a communication line with carrier waves as a medium.

Next, the movement positioning processing executed in the thus-constructed navigation device 1 will be described. The positioning based on the transmission data from the GPS satellite is referred to as "GPS positioning", and the position measurement based on the autonomous navigation function is referred to as "autonomous navigation positioning".

Figure 3A:
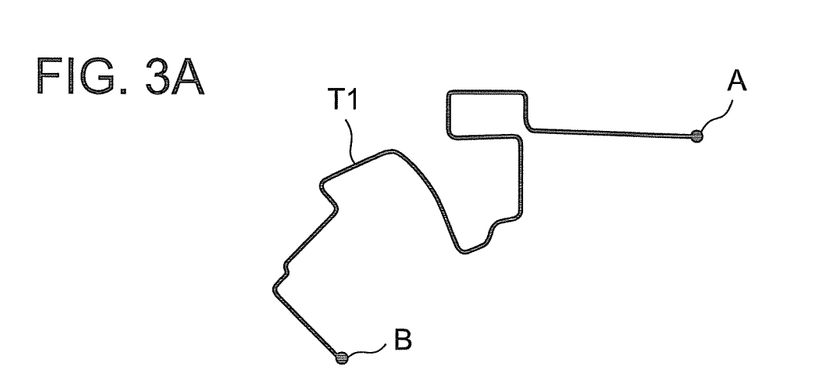
FIG. 3A shows an autonomous navigation positioning step executed on the basis of position data of a temporary starting point.
Figure 3B:
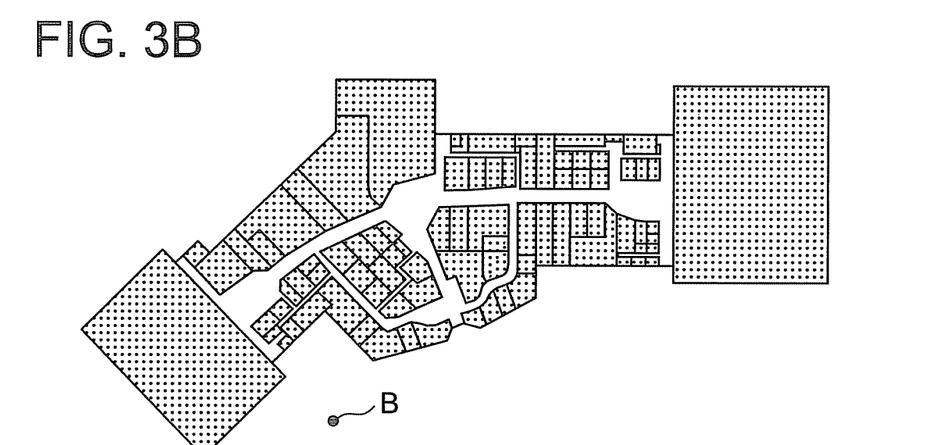
FIG. 3B shows a GPS positioning step of obtaining position data at some mid-point.
Figure 3C:
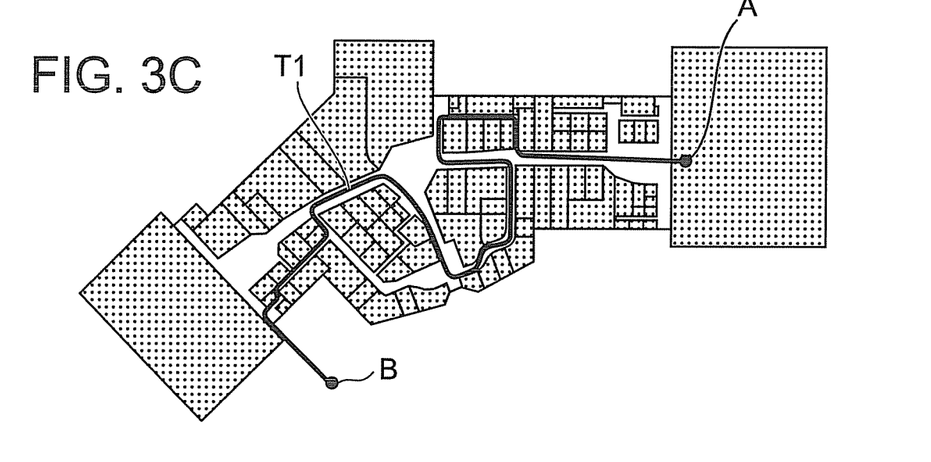
FIG. 3C shows a correcting step of correcting position data obtained by the autonomous navigation positioning.

FIGS. 3A to 3C are diagrams showing the processing content of the movement positioning processing. FIG. 3A shows an autonomous navigation positioning step executed on temporary position data of a start point A, FIG. 3B shows a GPS positioning step of obtaining position data at a point B during movement, and FIG. 3C shows a step of correcting position data obtained by the autonomous navigation measurement.

In the movement positioning processing, the position data of respective points on a moving route are successively obtained by using the autonomous navigation positioning and the GPS positioning in combination. For example, when the device goes in an area where electrical wave of the GPS satellite cannot be received, position data are obtained by the autonomous navigation positioning. On the other hand, when the device goes in an area where electrical wave of the GPS satellite can be received, position data are obtained by the GPS positioning.

Furthermore, according to the movement positioning processing of this embodiment, even in a case where the position data of a start point cannot be obtained by the GPS positioning at the time when the autonomous navigation positioning is started, temporary position data of a start point is set to perform the autonomous navigation positioning, and the temporary position data calculated by the autonomous navigation positioning is corrected afterwards, whereby true position data can be obtained.

For example, as shown in FIG. 3A, it is assumed that an area extending from a start point A of the movement positioning processing until just before a point B at which the autonomous navigation method is finished is contained in an area which no electrical wave of the GPS satellite can reach and true position data cannot be obtained at the start point A and at any mid-point on a locus T1.

In the movement positioning processing of this embodiment, in such a case, temporary position data "X: 0.0, Y: 0.0 (the value of X-coordinate representing longitude is equal to "0.0", and the value of Y-coordinate representing latitude is equal to "0.0")" is first set to the start point A at which the autonomous navigation positioning is started as indicated by first ("No. 1") data of FIG. 2A, for example.

The autonomous navigation positioning is continuously performed during movement by using the temporary position data "X: 0.0, Y: 0.0", and the position data of respective points on the moving route are successively calculated. For example, the first to N-th data as shown in FIG. 2A are obtained. These position data are plotted to obtain the locus T1 of FIG. 3A. These position data are the position data before correction which are calculated on the basis of the temporary position data at the start point A, and thus all the correction flag for the position data are set to "0" in the movement record data of FIG. 2A.

Subsequently, when during a series of autonomous navigation positioning, the device reaches the point B at which electrical waves of the GPS satellite can be received, the GPS positioning is allowed to be performed, and thus the GPS positioning is automatically performed. Then, as shown in FIG. 3B, the true position data at the point B can be obtained, so that it can be specified which point on a map the device is located at.

Furthermore, when the true position data (for example, "X: 280.0, Y: 180.0") is given, the temporary position data of FIG. 2A which has been obtained by the autonomous navigation positioning until just before the true position data is given is corrected to the true position data. In this correcting processing, with respect to the point B at which the true position data is given, a shift amount from the position data "X: −61.0, Y: 39.0" (the N-th data of FIG. 2A) obtained by the autonomous navigation positioning until the true position data "X: 280.0, Y: 180.0" obtained by the GPS positioning is calculated. For example, in this example, the shift amount is set to "+341.0" in the X direction and "+141.0" in the Y direction.

This shift amount is added to all non-corrected position data obtained by the autonomous navigation positioning. After the shift amount is added, the correction flag representing whether the position data has been corrected is updated to "1". At this time, the temporary position data registered in the movement record data of FIG. 2A is corrected to true position data as indicated in the movement record data of FIG. 2B. A series of corrected position data are plotted on a map, thereby obtaining a locus T1 of FIG. 3C. The correction processing as described above is executed by the autonomous navigation data correction processor 21 on the basis of an instruction of CPU 10.

Through the correcting processing as described above, even when no position data can be obtained at the start point A for the autonomous navigation positioning, the autonomous navigation positioning is continued, and the position data based on the GPS positioning are obtained during movement or at a movement end point B, whereby the position data from the start point A to the point B can be obtained afterwards.

Furthermore, when a user continues to move, the GPS positioning and the autonomous navigation positioning are executed, and then the position data of the moving route are continually obtained. In the subsequent autonomous navigation positioning, the position data of the reference point at which the autonomous navigation positioning is started has been already obtained, and thus it is unnecessary to perform the autonomous navigation positioning using the temporary position data as described above. Therefore, the usual autonomous navigation positioning is performed.

Figure 4:
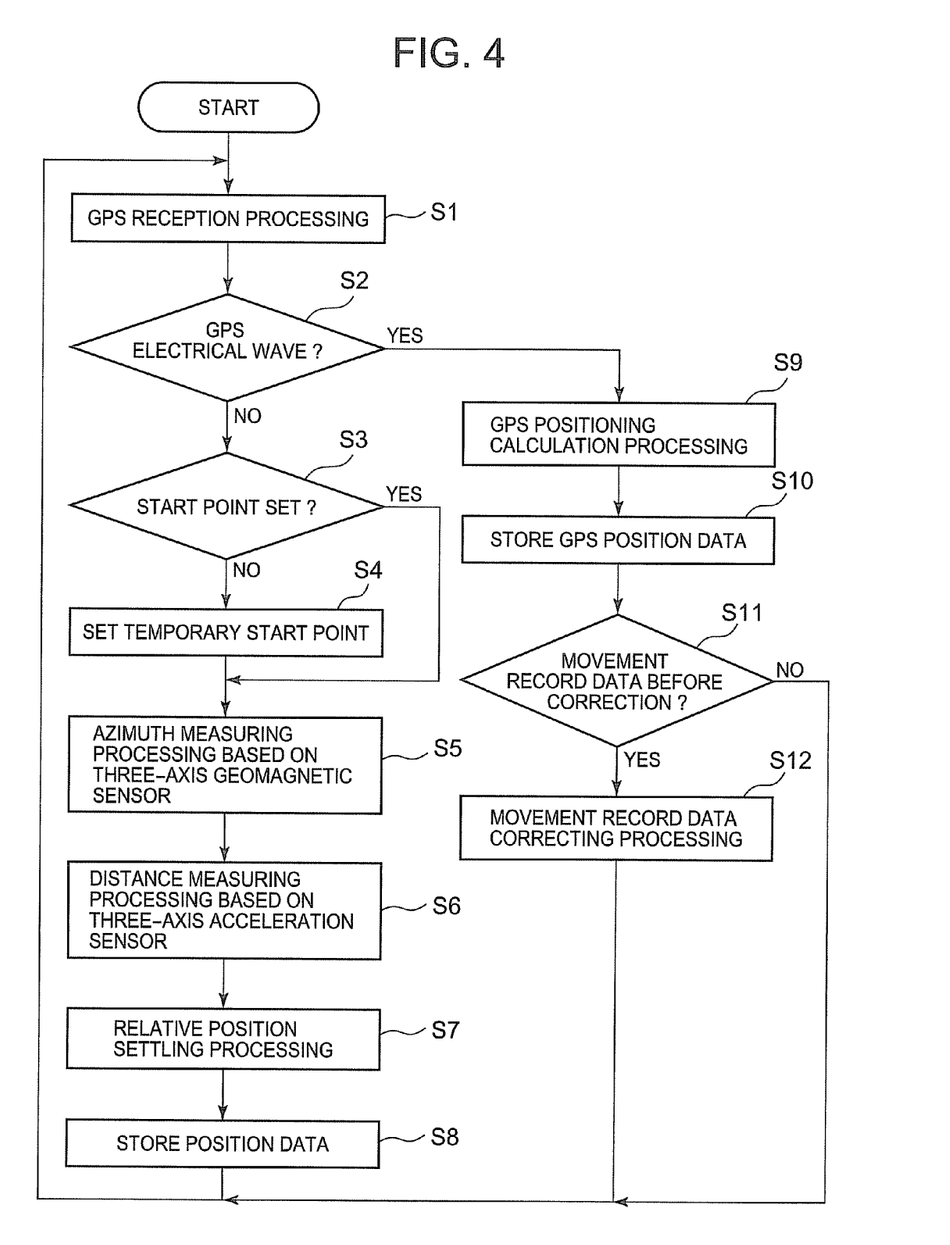
FIG. 4 is a flowchart showing the control process of movement positioning processing of this embodiment executed by CPU.

FIG. 4 is a flowchart showing the movement positioning processing executed by CPU 10. Next, the movement positioning processing will be described in detail with reference to this flowchart.

The movement positioning processing is started when the navigation device 1 is powered on or a starting operation is input through the operating unit 26. When the movement positioning processing is started, first, CPU 10 generates a command to the GPS receiver 14 and makes the GPS receiver to execute reception processing of transmission data from the GPS satellite (step S1). Then, CPU 10 determines whether there is any electrical wave of GPS (step S2), and when there is an electrical wave, the processing shifts to step S9 to perform the GPS positioning. When there is no electrical wave, the processing shifts to step S3 to perform the autonomous navigation positioning.

As a result, when there is no electrical wave of GPS and thus the processing shifts to the step S3, CPU 10 determines in step S3 whether position data of a start point for the autonomous navigation positioning is set or not. Here, for example, when the GPS positioning is executed just before and the position data of the start point is known, this position data is set as the position data of the start point. When the autonomous navigation positioning is continuously repeated, the position data of the start point has been set at the first stage of a series of autonomous navigation positioning. Accordingly, in such a case, in the determination processing of the step S3, the processing of CPU 10 is branched to "YES" side, and it shifts to step S5.

At the stage that the GPS positioning has not been executed just before and the autonomous navigation positioning is first executed, the position data of the start point is not set, and thus in the determination processing of the step S3, the processing of CPU 10 goes to "NO" side to set the temporary position data of the start point. For example, the first position data "X: 0.0, Y: 0.0" of FIG. 2A is set as the position data of the start point. Then, the processing shifts to step S5.

When the processing shifts to the step S5, CPU 10 first sends measurement data of the three-axis geomagnetic sensor 15 to the autonomous navigation control processor 20 to perform the azimuth measurement processing (step S5). Subsequently, CPU 10 sends measurement data of the three-axis acceleration sensor 16 to the autonomous navigation control processor 20 to perform the measurement processing of the moving direction and the moving distance (step S6). Furthermore, CPU 10 settles the data of the relative positional change to the position data at the preceding stage of the movement record data from the measured moving direction and moving distance (step S7: position calculating unit). The settled data is added to the position data at the preceding stage of the movement record data to calculate the present position data, and the calculated present position data is stored in the movement record data.

When the navigation device 1 is moved in an area where there is no electrical wave of GPS, the processing of the steps S5 to S8 is repetitively executed, and the position data of the respective points on the moving route are successively calculated by the autonomous navigation positioning and stored in the movement record data. When there is no position data at the start point for the autonomous navigation positioning, in step S4 the temporary position data of the start point is set as shown in FIG. 2A, the temporary position data of the start point for which the correction flag is set to "0" is successively stored into the movement record data as the position data of the respective points on the moving route.

In the determination processing of step S2, when there is an electrical wave of GPS and the processing of CPU 10 shifts to "YES" side, CPU 10 performs the GPS positioning calculation on the basis of the transmission data of the GPS satellite which is previously received in step S1 to calculate the position data representing the present position (step S9). This position data is stored in the movement record data (step S10). In the movement record data, the position data based on the autonomous navigation positioning and the position data based on the GPS positioning are stored separately from each other.

When the position data of the GPS positioning is stored, it is determined whether position data before correction (i.e., non-corrected position data), that is, position data whose correction flag is set to "0" is contained in the movement record data (step S11). When there is not any non-corrected data in the movement record data, the processing returns to step S1. However, when there is any non-corrected data in the movement record data, the processing of CPU 10 shifts to "YES" side, and an instruction is generated to the autonomous navigation data correcting processor 21 to execute the correction processing on the position data of the autonomous navigation positioning obtained by using the temporary position data of the start point (step S12: position data correcting unit). The correction processing has been described with reference to FIGS. 2 and 3. Then, the processing of CPU 10 returns to the step S1.

Through the movement positioning processing as described above, in an area where the GPS positioning can be performed, the processing of the steps S1, S2, S9 to S11 is repetitively executed and the GPS positioning is continuously performed, whereby the position data of respective points on the moving route are successively stored in the movement record data storing unit 22. On the other hand, in an area where the GPS positioning cannot be performed, the processing of the steps S1 to S3 and S5 to S8 is repeated, and the autonomous navigation positioning is continuously performed, whereby the position data of respective points on the moving route are successively stored into the movement record data storing unit 22.

When no position data can be obtained at the start point of the autonomous navigation positioning, the temporary position data is set in step S4, and then next temporary position data is continuously obtained by the subsequent autonomous navigation positioning. When the GPS positioning is enabled to be performed, these temporary position data are corrected to obtain true position data.

[Modifications]

Figure 5A:
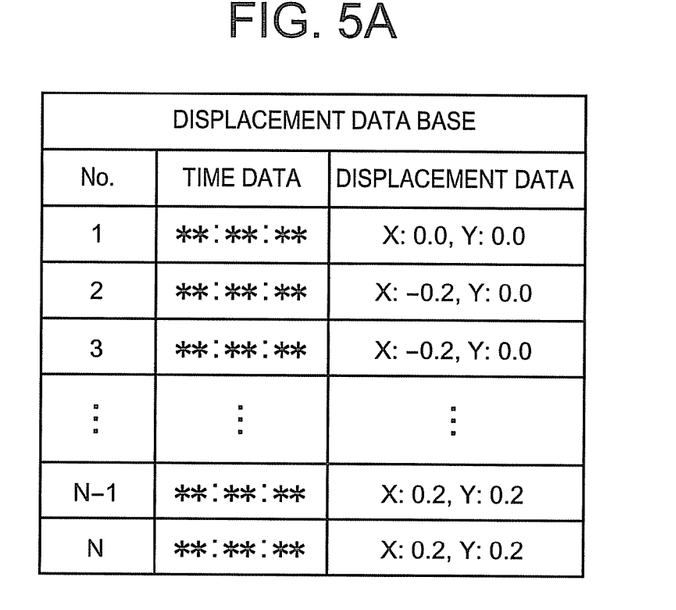
FIG. 5A is a data chart before position data are calculated.
Figure 5B:
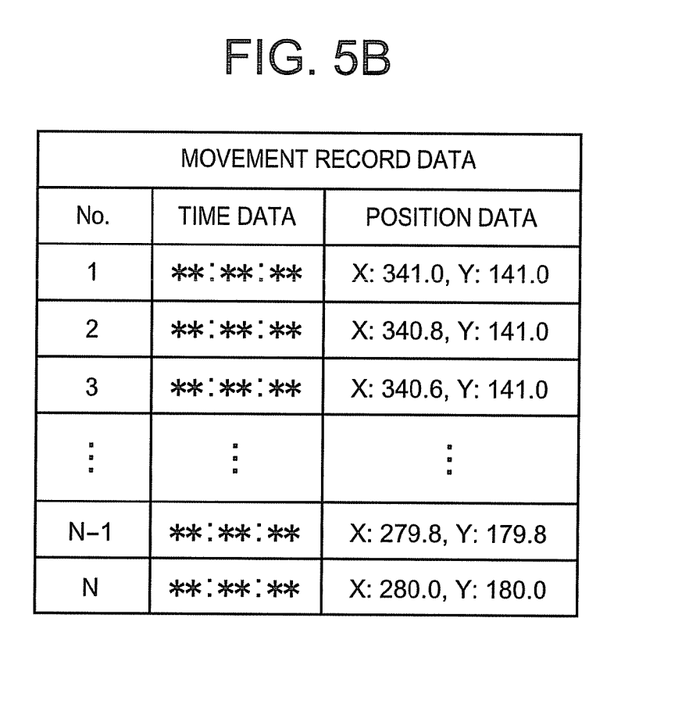
FIG. 5B is a data chart after position data are calculated.

FIGS. 5A and 5B are data charts showing another method of the autonomous navigation positioning executed under the state that the position data of the start point is not obtained.

In the above embodiment, when the autonomous navigation positioning is executed under the state that the position data of the start point is not obtained, the temporary position data of the start point is given to execute the autonomous navigation positioning. However, according to the following method, the position data of the moving route can be calculated after the autonomous navigation positioning is likewise performed.

That is, first, when no position data is obtained at the start point A (see FIG. 3) of the autonomous navigation positioning, a displacement data base (change data storing unit) as shown in FIG. 5A is created in RAM 11 or a storage device (not shown), and the displacement data calculated in the autonomous navigation control processor 20 are successively stored in the displacement data base. The displacement data represents the relative positional change between two continuous points whose position data are determined on the moving rout, and the N-th displacement data "X: 0.2, Y: 0.2" of FIG. 5A represents that the N-th point is shifted from the (N−1)-th point by the distance of "0.2" in the east-west direction and the distance of "0.2" in the north-south direction.

Subsequently, when position data (for example, position data "X: 280.0, Y: 180.0") are obtained by the GPS positioning at the point B (see FIG. 3) during movement of the autonomous navigation positioning, by using this position data and the displacement data base of FIG. 5A, the position data of the respective points over which the device has past passed are successively determined by the calculation pattern of the normal autonomous navigation positioning and the inverse calculation processing.

That is, as indicated by the N-th position data of the movement record data of FIG. 5B, the position data of the point B is set by directly substituting the position data of the GPS positioning. Subsequently, as indicated by the N-th displacement data of FIG. 5A and the N-th and (N−1)-th position data of FIG. 5B, the N-th displacement data is subtracted from the N-th position data, and the subtraction result is set as the (N−1)-th position data. The subtraction processing as described above is repetitively executed until the first position data.

As shown in FIG. 5B, through the processing as described above, the position data of respective points of the moving route at which the autonomous navigation positioning is executed without any position data of the start point A can be determined afterwards.

As described above, according to the navigation device 1, the positioning method thereof and the program of the movement positioning processing of this embodiment, during movement, the moving direction and the moving distance are successively measured by the autonomous navigation sensors 15 and 16, and position data are obtained at any mid-point during movement or at a movement end point, whereby the position of each point which has been already passed can be obtained afterwards. Accordingly, even in a case where the position data of the movement start point cannot be obtained, position data of respective points on the moving route can be obtained when position data can be obtained during movement or at a movement end point.

Since the position data of the moving route can be obtained afterwards, the position data can be effectively used to a case where a moving route is checked after actual movement or a case where in combination with a digital camera, position data of points at which images are picked up by the digital camera are stored in combination with pickup image data.

Furthermore, the navigation device 1 of this embodiment is provided with the positioning unit which can perform the GPS positioning. Therefore, the autonomous navigation positioning is continuously performed during movement in a building which no GPS electrical wave reaches, and then the GPS positioning is executed outdoors, whereby the position data of respective points on a moving route in the building can be obtained afterwards.

Furthermore, according to the navigation device 1, the positioning method thereof and the program of the movement positioning processing of this embodiment, when the temporary position data is given at the start point to perform the autonomous navigation positioning and position data is given at any mid-point during movement or at a movement end point, the temporary position data obtained by the autonomous navigation positioning are wholly shifted and corrected to true position data. Therefore, the storage capacity required for this correction processing can be reduced, and the load of the calculation required for the above processing can be reduced.

Furthermore, according to the autonomous navigation positioning system of the above modification, the displacement data is stored when the autonomous navigation positioning is executed, and the position data are calculated back from the terminal side to the start side of the moving route when position data is given at any mid-point during movement or at a movement endpoint. Therefore, as compared with a method of storing all the sampling data of the detection outputs of the autonomous navigation sensors 15 and 16 and determining position data of past moving points by using these sampling data, the storage capacity required for the processing can be reduced, and the calculation processing load required for this processing can be reduced.

The present invention is not limited to the above embodiments, and various modifications may be made. For example, in the above embodiments, the autonomous navigation positioning operation and the correction processing of the position data are executed by the autonomous navigation control processor 20 and the autonomous navigation data correcting processor 21. However, these operations may be implemented by software processing of CPU 10.

Furthermore, in the above embodiments, the positioning unit performs the positioning operation by using GPS. However, the present invention may use various other kinds of constructions such as a construction of performing positioning through communications with a base station of a cellular phone, a construction of receiving or inputting position data by using RFID (Radio Frequency Identification) or the like to settle the present position.

Still furthermore, the three-axis geomagnetic sensor and the three-axis acceleration sensor are used as the movement measuring unit for measuring relative position change. However, a two-axis azimuth sensor and a two-axis acceleration sensor may be used insofar as the top-to-bottom orientation of device is fixed. Furthermore, a gyroscope or the like may be applied to determine the azimuth. A wheel speed sensor may be used to determine a moving speed. In the above embodiments, the position data obtained by the movement positioning processing are set to two-dimensional position data, however, it may contain position data of the height direction.

Still furthermore, in the above embodiments, the processing of the autonomous navigation positioning for obtaining the position data afterward is executed only when the GPS cannot be performed at the start time of the movement positioning processing. However, there may be adopted a construction of intermittently performing the GPS positioning operation even in an area where GPS electrical waves can be received, obtaining position data by the autonomous navigation positioning between the GPS positioning operations, and also setting the autonomous navigation positioning executed between the GPS positioning operations as a method of obtaining position data afterward.

In the above embodiments, the present invention is applied to the portable navigation device 1, however, the present invention may be applied to a positioning device which can be mounted in a vehicle. The other details, etc. of the embodiments may be properly changed without departing from the subject matter of the present invention.

The invention claimed is:

1. A positioning device comprising:
a movement measuring sensor for measuring a relative positional change, the relative positional change being independent of geographic location of the positioning device;
a GPS receiver configured to provide a present position information associated with geographic location of the positioning device;
a passing position calculation control unit configured to calculate a relative movement from the relative positional change measured by the movement measuring sensor; and
a processor configured to receive the present position information from the GPS receiver and to determine whether the present position information is measurable by the GPS receiver, wherein:
positioning is determined from the present position information provided by the GPS receiver in response to the processor determining the present position information is measurable by the GPS receiver, and
the relative movement is calculated by the passing position calculation control unit in response to the processor determining the present position information is not measurable by the GPS receiver, and
in response to the present position information being determined by the processor to be provided by the GPS receiver after a period of time of not providing the present position information by the GPS receiver, the processor determines revised position data of a point which has been passed and which has been determined from the relative movement independent of geographic location, the revised position data being determined on the basis of a difference between position data of a first geographic position point obtained by the processor in response to the GPS receiver providing the present position information after a period of time of not providing the present position information by the GPS receiver and a last geographic independent point determined by the movement measuring sensor.

2. The positioning device according to claim 1, further comprising a position calculating unit for accumulating data associated with the relative positional change measured by the movement measuring sensor into position data of a start point to calculate position data of points on the moving route, wherein the processor further comprises:
a temporary position data calculation control unit for giving temporary position data of the start point to the position calculating unit, and making the position calculating unit to calculate temporary position data of the points on the moving route;
a position data storing unit for storing the temporary position data of the points on the moving route obtained by the temporary position data calculation control unit; and
a position data correcting unit for shifting the temporary position data of the points on the moving route stored in the position data storing unit so that position data calculated at the first point by the position calculating unit is identical to the given position data of the first point.

3. The positioning device according to claim 1, wherein the processor further comprises:
a change data storing unit for storing data of the relative positional change measured by the movement measuring unit sensor during movement; and
a passing position calculating unit for successively subtracting the data of the relative positional change stored in the change data storing unit from the given position data of the first point, thereby obtaining position data of respective points which have been passed before arrival at the first point.

4. A positioning method for obtaining position data on a moving route comprising:
using a processor and at least one sensor to perform:
acquiring a measurement of a relative positional change that is independent of geographic location;
determining whether a present position associated with geographic location is measurable;
generating a set of position data from the measurement of relative positional change in response to determining the present position is not measurable;
a second determining of whether the present position is measurable;
acquiring a first present position associated with a geographic location in response to a determination that the present position is measurable by the second determining;

acquiring a second measurement of relative positional change; and generating correction data for the position generated from the measurement of relative positional change from a difference in position data between the first present position and the second measurement of relative positional change.

5. The positioning method according to claim 4, further comprising acquiring a sequence of measurements of the relative positional change independent of geographic location and settling data of the relative positional change into position data of a start point and position data of points on the moving route;

employing temporary position data of the start point and calculating temporary position data of the points on the moving route;

storing the temporary position data of the points on the moving route; and shifting the temporary position data of the stored points on the moving route by the difference in position data so that the position data of the start point and the points on the moving route acquired independent of geographic location are corrected for respective geographic locations.

6. The positioning method according to claim 4, wherein acquiring the measurement of the relative positional change further comprises:

storing data of the relative positional change; and successively subtracting the data of the relative positional change from the first present position associated with the geographic location, thereby obtaining position data of respective points which have been passed before arrival at the first present position.

* * * * *

UNITED STATES PATENT AND TRADEMARK OFFICE
CERTIFICATE OF CORRECTION

| | | |
|---|---|---|
| PATENT NO. | : 8,862,396 B2 | |
| APPLICATION NO. | : 12/817321 | |
| DATED | : October 14, 2014 | |
| INVENTOR(S) | : Masao Sambongi | |

It is certified that error appears in the above-identified patent and that said Letters Patent is hereby corrected as shown below:

In the Claims,

Column 10, Claim 3, Lines 44-45:

positional change measured by the movement measuring unit sensor during movement; and It should read:

positional change measured by the movement measuring sensor during movement; and Signed and Sealed this
Third Day of March, 2015

Michelle K. Lee
*Deputy Director of the United States Patent and Trademark Office*